United States Patent [19]

Derby et al.

[11] Patent Number: 5,092,953
[45] Date of Patent: Mar. 3, 1992

[54] AQUEOUS VINYL CHLORIDE-ETHYLENE COPOLYMER/POLYISOCYANATE ADHESIVE COMPOSITIONS FOR WOOD COMPOSITES

[75] Inventors: Richard Derby, Allentown; Bheema R. Vijayendran, Emmaus, both of Pa.

[73] Assignee: Air Products and Chemicals, Inc., Allentown, Pa.

[21] Appl. No.: 436,161

[22] Filed: Nov. 13, 1989

Related U.S. Application Data

[63] Continuation-in-part of Ser. No. 326,699, Mar. 21, 1989.

[51] Int. Cl.$^5$ ............................................. C09J 123/08
[52] U.S. Cl. ............................ 156/331.7; 524/459; 524/503; 524/507
[58] Field of Search ............... 524/459, 503, 507, 197; 428/425.1, 511; 156/331.7, 333

[56] References Cited

U.S. PATENT DOCUMENTS

| | | | |
|---|---|---|---|
| 3,632,789 | 1/1972 | Wilhelm et al. | 260/33.6 |
| 3,931,088 | 1/1976 | Sakurada et al. | 260/29.6 |
| 3,996,154 | 12/1976 | Johnson et al. | 252/312 |
| 4,189,415 | 2/1980 | Eck et al. | 524/459 |
| 4,191,833 | 3/1980 | Tucker | 548/378 |
| 4,215,023 | 7/1980 | Strolle | 260/22 CB |
| 4,268,641 | 5/1981 | Koenig | 525/367 |
| 4,295,910 | 10/1981 | Cooley et al. | 156/314 |
| 4,340,682 | 7/1982 | Legue et al. | 524/507 |
| 4,396,738 | 8/1983 | Powell et al. | 524/507 |
| 4,433,095 | 2/1984 | Hombach et al. | 524/563 |
| 4,476,276 | 10/1984 | Gasper | 524/500 |
| 4,491,646 | 1/1985 | Gruber | 524/558 |
| 4,518,729 | 5/1985 | Briedenbach et al. | 524/101 |
| 4,609,690 | 9/1986 | Gruber et al. | 523/334 |
| 4,636,546 | 1/1987 | Chao | 524/507 |
| 4,663,377 | 5/1987 | Hombach et al. | 524/196 |
| 4,673,702 | 6/1987 | Iacoviello | 524/459 |
| 4,767,816 | 8/1988 | Iacoviello et al. | 524/459 |

FOREIGN PATENT DOCUMENTS 59-59768  4/1984  Japan.

*Primary Examiner*—Joseph L. Schofer
*Assistant Examiner*—R. H. Delmendo
*Attorney, Agent, or Firm*—Michael Leach; James C. Simmons; William F. Marsh

[57] ABSTRACT

A water-based adhesive composition comprising a polyvinyl alcohol stabilized vinyl chloride-ethylene copolymer latex and 5-50 wt %, based on copolymer, of a polyisocyanate material. The adhesive composition has improved pot life and is used to prepare wood composites demonstrating improved water resistance.

11 Claims, No Drawings

AQUEOUS VINYL CHLORIDE-ETHYLENE COPOLYMER/POLYISOCYANATE ADHESIVE COMPOSITIONS FOR WOOD COMPOSITES

CROSS-REFERENCE TO RELATED APPLICATION

This application is a continuation-in-part of copending application Ser. No. 07/326,699 filed 21 March 1969, which is incorporated by reference.

TECHNICAL FIELD

This invention relates to water-based adhesive compositions containing an isocyanate compound and, more particularly, relates to vinyl chloride-ethylene copolymer/polyisocyanate adhesive compositions.

BACKGROUND OF THE INVENTION

There is a need for water-based adhesive compositions to provide high strength, bonded wood composites that would be suitable for use in exterior applications, particularly when laminated at room temperature. Another hindrance to the use of water-based systems is that most polymer/isocyanate adhesive compositions have very limited pot lives of less than about 30 minutes. In the past, self-crosslinking vinyl and acrylic polymers and the combinations of these polymers with polyisocyanates have been used in making wood composites, but these either fell short of the required bond characteristics or were difficult to employ because of the relatively short pot life or toxicity shortcomings.

U.S. Pat. No. 3,632,789 discloses a process for the production of coatings based on reaction products of polyisocyanates with copolymers containing hydroxyl groups which have been prepared by polymerization of the monomers in an organic liquid (which does not react with isocyanates in the presence of the soluble polymer) as the insoluble copolymer dispersed in the organic liquid.

U.S. Pat. No. 3,931,088 discloses an adhesive composition comprising: (1) a member selected from the group consisting of an aqueous solution of polyvinyl alcohol, an aqueous emulsion of vinyl acetate polymer and an aqueous latex of butadiene polymer, and (2) a hydrophobic solution of an isocyanate compound or polymer.

U.S. Pat. No. 4,191,833 discloses ethylenically unsaturated blocked aromatic di-isocyanates which readily polymerize to form homopolymers and interpolymers with copolymerizable vinylidene monomers. Polymers can be prepared via emulsion polymerization and exhibit excellent stability to hydrolysis when stored in latex form.

U.S. Pat. No. 4,215,023 discloses a thermosetting coating composition of a urethane polymer having film-forming constituents of an organic polyisocyanate, a polymer of polymerized ethylenically unsaturated monomer units which contains pendant hydroxyl-containing groups and a hydroxyl-containing alkyd plasticizer.

U.S. Pat. No. 4,268,641 discloses copolymers of acrylic acid and nonionic surfactant acrylates useful as thickening agents for both aqueous solutions and water/liquid hydrocarbon emulsions.

U S. Pat. No. 4,295,910 discloses a lamination process for the lamination of a vinyl film to a cellulosic substrate, such as a wood product, e.g., particleboard wherein grain swelling of the substrate is avoided. The process involves coating the wood product substrate with an organic polyisocyanate having at least two active isocyanate groups per molecule as a primer coat, and thereafter applying a vinyl acetate-ethylene copolymer emulsion adhesive to the primed substrate to form an interlaminate adhesive layer. A vinyl polymeric film is then applied to the adhesive coated substrate to form a permanently bonded laminate of the substrate and of the film.

U.S. Pat. No. 4,340,682 discloses a curable urethane adhesive composition having a high green strength consisting essentially of a mixture of an isocyanate terminated ricinoleate prepolymer and chlorinated polyvinyl chloride curable by reaction with compounds having reactive hydrogen such as water, amines, polyols, urethanes, ureas and the like.

U.S. Pat. No. 4,396,738 discloses aqueous adhesive and coating compositions comprising:

(1) an aqueous emulsion or dispersion of a polymer or interpolymer of one or more vinyl monomers such as an emulsion of a copolymer of vinyl acetate and butyl acrylate; and (2) an aqueous emulsion or dispersion of a polyisocyanate which has at least partially reacted with an alcohol having the formula ROH wherein R is a hydrocarbon radical having at least one carbon atom and wherein the dispersion or emulsion (2) is stabilized with a combined surfactant and alcohol, having the formula $R^1OH$ wherein $R^1$ is a hydrocarbon radical having at least one carbon atom as described.

U.S. Pat. No. 4,433,095 discloses aqueous adhesives which are based on water-dispersible polymers and which contain water-dispersible polyisocyanate preparations having an average NCO-functionality of at least 2.2, which in addition to an aromatic polyisocyanate or a mixture of aromatic polyisocyanates, contain a quantity of emulsifiers sufficient to guarantee the dispersibility of the polyisocyanates as additives capable of improving the bonding properties of these adhesives.

U.S. Pat. No. 4,476,276 discloses a sealing composition prepared by reacting water soluble polyurethane prepolymer with water containing latex to provide a gelled viscous mass which will cure to a cross-linked latex-reinforced gel capable of preventing or inhibiting leakage in various structures, when applied at the site of the leakage in the viscous state.

U S. Pat. No. 4,491,646 discloses an aqueous latex adhesive composition of the type having an aqueous latex admixture with an organic solvent-dispersed multi-isocyanate cross-linking agent and a thickener. The improvement for a room temperature curable adhesive composition having improved water-resistance comprises the curable ingredients consisting essentially of an aqueous hydroxyl functional acrylic latex which contains hydroxyl groups as the only isocyanate reactive functionality and the multi-isocyanate cross-linking agent.

U.S. Pat. No. 4,609,690 discloses an aqueous latex adhesive composition which is an aqueous latex admixture with a water dispersible multi-isocyanate cross-linking agent and a thickener. The improvement for a room temperature curable adhesive composition having improved water-resistance comprises the curable ingredients consisting essentially of an aqueous hydroxyl functional latex which contains hydroxyl groups as its only isocyanate reactive functionality and the multi-isocyanate cross-linking agent. The cross-linking agent is a water dispersible or water dispersed multi-isocyanate and preferably is a multi-isocyanate which has undergone partial reaction of some of its isocyanate groups with a hydrophobic monohydroxy alcohol.

U.S. Pat. No. 4,663,377 discloses a polyisocyanate preparation dispersible in water and having an average NCO functionality of about 2.0 to 3.5, which contains:

(a) an aliphatic polyisocyanate or a mixture of aliphatic polyisocyanates; and (b) a quantity of an emulsifier sufficient to ensure the dispersibility of the polyisocyanates.

This polyisocyanate preparation is used as an additive for aqueous adhesives based on polymers dispersed in water.

U.S. Pat. No. 4,767,816 discloses an aqueous copolymer emulsion comprising a copolymer consisting essentially of vinyl chloride, ethylene, and up to 10 wt % hydroxyalkyl (meth)acrylate colloidally dispersed in an aqueous medium. The latexes can be used as a saturant binder for filter stock substrates. Optionally, the latex can be cross-linked with melamine-formaldehyde, phenol-formaldehyde, urea-formaldehyde, or reactive polymeric isocyanates to enhance the strength and other mechanical properties of the treated filter.

J57/85,871 discloses an adhesive composition comprising an emulsion of ethylene/vinyl acetate copolymer containing polyvinyl alcohol and an adduct of di-isocyanate prepolymer with a polyhydric alcohol.

SUMMARY OF THE INVENTION

The present invention provides a water-based adhesive composition especially for wood composite applications which demonstrates good pot life and superior bond strength and water resistance. The aqueous adhesive composition consists essentially of:

(a) an aqueous vinyl chloride-ethylene copolymer latex comprising from 20 to 70 wt % of a copolymer consisting essentially of about 65-90 wt % vinyl chloride, about 5-35 wt % ethylene and, optionally, up to about 10 wt % hydroxyalkyl (meth)acrylate, the copolymer prepared by aqueous emulsion polymerization of the monomers in the presence of a stabilizing system consisting essentially of 3 to 15 wt % polyvinyl alcohol, the wt % values of the copolymer being based on vinyl chloride monomer, and (b) 5 to 50 parts by weight per 100 parts copolymer of a polyisocyanate.

In a preferred embodiment, non-water dispersible polyisocyanates are suprisingly suitable for combining with the polyvinyl alcohol stabilized vinyl chloride-ethylene copolymer latex to make the water-based adhesive composition.

Another embodiment of the invention provides a method for joining or laminating one substrate (preferably wood) to another substrate, especially to make a wood composite, which comprises applying a coating of the water-based adhesive composition to a surface of the substrate, partially drying the adhesive coating and joining the adhesive-coated surface with a surface of the other substrate. A further embodiment is a laminate comprising the two substrates bonded together with the adhesive composition. The invention provides high performance, exterior grade wood assemblies such as, for example, fire door assemblies, wood mouldings, laminated lumber, and reconstituted wood boards.

The aqueous adhesive compositions of the invention also obviate the environmental and health concerns associated with solvent-containing adhesives.

The adhesive compositions according to the invention provide laminates with exceptional bond strength, even when laminated at room temperature.

Compared to conventional polymer/isocyanate systems the following advantages are afforded by the adhesive compositions of the invention:

A significant increase in pot life during which acceptable bonds can be achieved.

A solvent- and plasticizer-free composition.

Superior adhesion and water resistance.

Improved handling and compatibility with existing application equipment and less down-time because clean-up is easier and the applicator rolls are not attacked by the chemicals in the adhesive composition.

DETAILED DESCRIPTION OF THE INVENTION

The water-based adhesive composition comprises an aqueous medium containing an adhesive component which comprises a vinyl chloride-ethylene emulsion copolymer and a polyisocyanate.

Perhaps the most important ingredient of the water-based adhesive composition according to the present invention is the vinyl chloride-ethylene emulsion copolymer. The adhesive composition comprises an aqueous polyvinyl alcohol stabilized vinyl chloride-ethylene copolymer latex, which is 20-70 wt % solids, preferably 40-60 wt % solids, the copolymer containing 5-50 wt %, preferably 10-30 wt %, based on copolymer, of a solvent-free, water-dispersible polyisocyanate material. The viscosity of the adhesive composition should be within the range of 200-5000 cps. A copolymer prepared from a monomer mixture that is 65-90 wt % vinyl chloride, 5-35 wt % ethylene and 0-10 wt % hydroxyalkyl (meth)acrylate in the presence of a polyvinyl alcohol stabilizing system would suitably have a Tg from about 0-40° C., preferably 5-30° C.

The polyvinyl alcohol/vinyl chloride-ethylene copolymers preferably contain about 75-80 wt % vinyl chloride. The copolymerization reaction is performed under an ethylene pressure which is sufficient to provide the copolymer with 5-35 wt % ethylene content, preferably about 20-25 wt %. Pressures of about 50-100 atm are generally used to afford such ethylene content.

Most advantageously, the vinyl chloride-ethylene copolymers would also contain up to about 10 wt %, preferably 2-8 wt %, of a $C_2$-$C_4$ hydroxyalkyl acrylate or hydroxyalkyl methacrylate. The $C_2$-$C_4$ hydroxyalkyl group may be hydroxypropyl, hydroxybutyl or the preferred hydroxyethyl. The term "hydroxyalkyl (meth)acrylate" means hydroxyalkyl acrylate and/or hydroxyalkyl methacrylate.

The dispersing agent, or protective colloid, used in preparing the latexes is at least one polyvinyl alcohol. A single polyvinyl alcohol may be used alone or mixtures of different polyvinyl alcohols can be used.

The amount of polyvinyl alcohol used in the polymerization reaction is about 3-15 wt %, preferably 4-10 wt %, based on monomers, substantially all of which is added initially to the aqueous medium, i.e. prior to initiation of polymerization. Additional amounts of polyvinyl alcohol can be added to the reactions during polymerization provided that at least about 3 wt %, preferably at least about 4 wt %, polyvinyl alcohol is present in the reaction mixture upon initiation.

The polyvinyl alcohols which are suitable for use in the invention are, in general, 70-91 mole% hydrolyzed, preferably 87-89 mole% hydrolyzed, and have a degree of polymerization (DPn) ranging from 200-4000, preferably 500-2500. A polyvinyl alcohol having a DPn at the lower end of the range, e.g. from 200 to about 400, should be used in combination with a polyvinyl alcohol having a higher DPn of about 500 or more.

Other protective colloids, such as celluloses or hydroxyalkyl celluloses, or typical emulsifying agents such as surfactants in combination with the polyvinyl alcohol may be used in amounts no greater than about equal proportions, based on weight of polyvinyl alcohol, although water resistance may be impaired.

Free radical sources, for example redox systems, used in the practice of this invention are conventional and used in conventional amounts. The polymerization is generally performed with quantities of a redox system ranging from 0.03-3 wt % based on monomers. Typically, the entire quantity of either the oxidant or reductant component of the redox system, or a substantial proportion, is introduced at the beginning and polymerization is initiated and controlled by metering in the other component. Obviously, the polymerization may be controlled by the simultaneous metering in of both components. Examples of the oxidizing component are ammonium persulfate, potassium persulfate, hydrogen peroxide and t-butyl hydroperoxide. Examples of the reducing component are sodium sulfite, sodium metabisulfite, zinc or sodium formaldehyde sulfoxylate and ascorbic acid and its enantiomer erythrobic acid. The preferred redox system comprises hydrogen peroxide and ascorbic or erythrobic acid.

The oxidizing agent is generally employed in an amount from about 0.01-1%, preferably 0.05-0.5%, based on weight of monomers introduced into the polymerization system. The reductant is ordinarily added in an aqueous solution in the necessary equivalent amount. It is important that a reductant be present in the polymerization recipe because the oxidant, in most cases, does not furnish free radicals rapidly enough at temperatures below about 80° C. to expeditiously effect polymerization of the monomers.

The polymerization process comprises:
(a) forming an aqueous emulsion reaction mixture containing substantially all the polyvinyl alcohol and a portion, preferably at least about 15%, of the total vinyl chloride monomer,
(b) pressurizing the reaction mixture with an ethylene pressure sufficient to provide the copolymer with about 5-35 wt % ethylene content,
(c) initiating the reaction mixture by the addition of a free radical forming source and continuing polymerization until the rate of polymerization begins to decrease,
(d) adding the remaining vinyl chloride, preferably at a substantially uniform rate over a period of time, while continuing polymerization until the reaction is no longer self-sustaining, and
(e) removing the unreacted ethylene and reducing the vinyl chloride free monomer content, preferably to less than 10 ppm.

Such process for the preparation of polyvinyl alcohol-stabilized vinyl chloride-ethylene copolymer latexes is described in more detail in U.S. Pat. Nos. 4,673,702 and 4,767,816, which disclosures are hereby incorporated by reference.

The hydroxyalkyl (meth)acrylate is preferably added to the polymerization reaction incrementally as a delay. By "delay" addition is meant the addition of a component in a continuous or intermittent and, preferably, a substantially uniform rate. The hydroxyalkyl (meth)acrylate could be delayed throughout the total reaction including the initial prepolymer preparation or delayed at various times during the final stages of the polymerization. However, the preferred method is to delay the hydroxyalkyl (meth)acrylate into the reaction with the vinyl chloride.

Polyvinyl alcohol/vinyl chloride-ethylene copolymer latexes for practicing the invention are available from Air Products and Chemicals, Inc. as XPOOO35 and Airflex® 7522 DEV latexes.

In addition to the polyvinyl alcohol/vinyl chloride-ethylene copolymer latex, the aqueous adhesive composition also contains per 100 parts by weight copolymer about 5-50 parts, preferably 10-30 parts, polyisocyanate.

The polyisocyanate material should be dispersible in the aqueous polyvinyl alcohol/vinyl chloride-ethylene copolymer latex such that at least a 6-8 hour dispersion stability is achieved. Stability beyond about 8 hours is not necessary since the adhesive composition would in almost all instances be used within 6 hours of preparation. The polyisocyanate material should have a functionality of greater than 2, preferably greater than 2.5, and ideally about 2.8.

It appears that the polyvinyl alcohol/vinyl chloride-ethylene copolymer latex assists in the dispersal of the polyisocyanate in the aqueous medium. Surprisingly, nonwater dispersible (non-emulsifiable) and water-dispersible (emulsifiable) polyisocyanate can suitably be used. Illustrative of suitable non-dispersible polyisocyanates are standard polymeric diphenyl methane di-isocyanate (PMDI) such as PAPI-27, PAPI-135 and Mondur MR brands commercially available from Dow Chemical and Mobay. Suitable solvent-free, water dispersible polyisocyanate materials include those taught in U.S. Pat. No. 4,433,095, which is incorporated by reference, and those materials commercially available from ICI Americas, Inc., such as Rubinate MF-178, Rubinate PBA 2259 and Rubinate PBA 2236 polyisocyanates, which are emulsifiable blends of diphenyl methane di-isocyanate (MDI) and polymeric diphenyl methane di-isocyanate (PMDI). U.S. Pat. No. 3,996,154 discloses suitable solvent-free dispersible organic isocyanates, which is incorporated by reference.

At less than about 5 wt % polyisocyanate material in the adhesive composition, the adhesive composition fails the boiling water test. At greater than about 50 wt %, the pot life of the adhesive composition is compromised. It is preferred that about 10-30 wt % polyisocyanate material (solid basis) be simply blended with the appropriate amount of the polyvinyl alcohol/vinyl chloride-ethylene copolymer latex.

The aqueous adhesive compositions for industrial applications may also contain other components well known in the art in typically used amounts such as plasticizer, defoaming agent, thickening agent, coalescing agent and filler. The use of surfactants, hydroxyl or carboxyl containing additives and acidic or basic fillers is not recommended. Associative thickeners are preferred.

| A representative formulation would be as follows: | |
|---|---|
| PVOH/VCl-Et Copolymer (Airflex 7522) | 100 pbw |
| Polyisocyanate (PAPI-27 or Rubinate MF 178) | 10-30 pbw |
| Plasticizer (Santicizer 160) | 2-5% |
| Defoamer (Foamaster UF) | 0.1-1% |

-continued

A representative formulation would be as follows:

| Thickener (Aerosol RM-825) | 0.1–1% |
|---|---|
| Optional: | |
| Coalescent (Exxate 700) | 5–10% |
| Filler (Clay) | 5–25% |

The components are simply mixed in the specified amounts to yield a water-based adhesive composition that will firmly bond such materials as plastics like vinyl chloride, polyester, metallized polyester and polystyrene, cellulosic substrates like wood, plywood and composite board, paper, and metal to themselves and to each other, especially composites comprising wood to wood substrates. Since the polyvinyl alcohol/vinyl chloride-ethylene copolymer will be an aqueous latex, the polyisocyanate material is merely added with gentle agitation and diluted with water, as necessary, to obtain an appropriate viscosity for application.

By using copolymers having a Tg value of 10° C. or less, there can be realized greater flexibility and a lesser tendency to delaminate due to stresses which are built up due to water absorption of the wood.

The incorporation of a hydroxyalkyl (meth)acrylate monomer into the copolymer makes the system more reactive toward isocyanates.

In the following examples, three-ply birch veneer laminates were prepared according to ASTM D906 and tested for boiling water resistance according to the National Bureau of Standards PS-51-71 "Voluntary Product Standard For Hardwood and Decorative Plywood."

EXAMPLE 1

In this example various vinyl chloride-ethylene (VCl-Et) copolymer emulsions and other emulsions were blended with 10 wt % Rubinate MF-178 polyisocyanate material and used to prepare hot press 3-ply birch veneer laminates that were subjected to the water boiling test.

TABLE 1

| | | | | WATER BOIL TEST | |
|---|---|---|---|---|---|
| RUN | POLYMER | PVOH STABILIZER | Tg (°C.) | BOND STRENGTH (psi) | % FIBER REMOVAL |
| 1 | VCl-Et | No | 14 | Failed in Boil Cycle | |
| 2 | VAc[a] | No | 28 | Failed in Boil Cycle | |
| 3 | VCl-Et | 6% | 22 | 290–390 | 50–90 |
| 4 | VCl-Et[b] | 6% | 10 | 460–590 | 75–100 |
| 5 | VAE[c] | 4% | −15 | 370–390 | 0–5 |

[a]Vinyl acetate homopolymer
[b]Copolymer also contains 4% hydroxyethyl acrylate
[c]Vinyl acetate-ethylene copolymer The data in Table 1 shows that the vinyl chloride-ethylene copolymer latexes prepared using polyvinyl alcohol as stabilizing agent (Runs 3 and 4) provided superior water resistance. Incorporation of hydroxyethyl acrylate into the copolymer (Run 4) provided for even better bond strength and adhesion.

EXAMPLE 2

In this example Airflex 7522 DEV polyvinyl alcohol/vinyl chloride-ethylene copolymer latex, which was the latex of Run 3, was blended with various amounts of Rubinate MF-178 polyisocyanate material.

TABLE 2

| RUN | % MF-178 | BOND STRENGTH (PSI) | % FIBER REMOVAL |
|---|---|---|---|
| 6 | 0 | Failed during boil cycle | |
| 7 | 10 | Variable, from good to failed in boil | |
| 8 | 20 | 370–425 | 100 |
| 9 | 30 | 360–500 | 30–70 |

Table 2 shows the effect of adding the polyisocyanate material to the copolymer latex on the boiling water resistance of 3-ply birch veneer laminates. It can be seen that at a 10% addition level in Run 7 the results were marginal. At 20 and 30 wt % levels in Runs 8 and 9, respectively, the adhesive composition demonstrated very good properties.

EXAMPLE 3

This example shows the cross-linking effect of the polyisocyanate material on the film properties of the Airflex 7522 DEV polyvinyl alcohol/vinyl chloride-ethylene emulsion copolymer. Rubinate MF-178 polyisocyanate was blended with the copolymer latex in the amounts indicated in Table 3 and the blended composition was drawn down to a film thickness of about 1 ml on a release surface.

TABLE 3

| RUN | % MF-178 | INITIAL TENSILE | TENSILE (5 min H₂O) |
|---|---|---|---|
| 10 | 0 | 260 | (PSI) 200 |
| 11 | 10 | 1030 | (PSI) 450 |
| 12 | 20 | 1905 | (PSI) 1830 |
| 13 | 30 | 2756 | (PSI) 2981 |

EXAMPLE 4

This example shows that even when the veneer laminates are bonded with the polyvinyl alcohol/vinyl chloride-ethylene copolymer latex (Airflex 7522 DEV) containing 20 wt % Rubinate MF-178 polyisocyanate material at room temperature (75° F.) laminates with exceptional bond strength are obtained. See Run 14 in Table 4.

TABLE 4

| | | | | BOND STRENGTH | | | |
|---|---|---|---|---|---|---|---|
| | | | | INITIAL | | AFTER WATER BOIL CYCLES | |
| RUN | TEMPERATURE (°F.) | PRESSURE (PSI) | TIME (min) | BOND STRENGTH (PSI) | FIBER TEAR (%) | BOND STRENGTH (PSI) | FIBER TEAR (%) |
| 14 | 75 | 55 | 120 | 590 | 100 | 315 | 100 |
| 15 | 300 | 55 | 5 | 519 | 100 | 351 | 80–100 |

EXAMPLE 5

This example demonstrates the improvement in the pot life of vinyl chloride-ethylene copolymer/isocyanate adhesive compositions when the copolymer is prepared in the presence of a polyvinyl alcohol. The pot life is determined by the free isocyanate (—NCO) in the composition according to the following titration procedure:

Pipette dry tetrahydrofuran (25 ml) and dibutyl amine (20 ml) into a flask and weigh sample of adhesive compositions into it. Stir for designated time. Add tetrahydrofuran (100 ml) and bromo phenol blue (2.5 ml). Titrate with 0.1N HCl to first yellow end point.

Free NCO $\% = [(B-A) \times N\ HCl \times 4.2)]/$sample weight
where
A = ml 0.1N HCl required for sample;
B = ml 0.1N HCl required for blank.

It is believed that the increase in the pot life of the adhesive compositions of the invention is the result of the polyvinyl alcohol/vinyl chloride-ethylene copolymer emulsion somehow retarding the rate of hydrolysis of the isocyanate functionality.

TABLE 5

| | % NCO in MDI | | |
|---|---|---|---|
| TIME (min) | Airflex 7522 DEV PVOH/VCl-Et | VAc HOMOPOLYMER | 16.7% MDI soln. |
| 10 | 25.7 | 32.4 | 29.1 |
| 30 | 24.3 | 22.1 | 27.2 |
| 60 | 21.8 | 16.8 | 23.5 |
| 120 | 21.2 | — | 17.5 |

Thus the use of polyvinyl alcohol stabilized vinyl chloride-ethylene copolymer latexes allows for their reaction with isocyanate functionality but yet provides protection from hydrolysis of the isocyanate as evidenced by the improved pot life.

EXAMPLE 6

The pot lives of various polymer latexes in combination with a water dispersible blend of diphenyl methane di-isocyanate (MDI) and polymeric diphenyl methane di-isocyanate (PMDI) were determined by their volume increases according to the following procedure:

Fill a container of 220 cc capacity with 100 g of the polymer latex/MDI-PMDI mixture. Stir well and allow to stand. The time necessary for the volume to double is a measurement of pot life for that adhesive mixture. In Table 6 each polymer latex was blended with 20% Rubinate MF-178 MDI/PMDI, based on polymer.

TABLE 6

| RUN | POLYMER | STABILIZER | TIME FOR VOLUME TO DOUBLE (MIN.) |
|---|---|---|---|
| 16 | VCl-Et | PVOH | 255 |
| 17 | VCl-Et | Surfactant | 200 |
| 18 | VAE | HEC/Surfactant | 130 |
| 19 | VAE | PVOH | 65 |
| 20 | VAc | PVOH | 30 |

It can be seen from Table 6 that the isocyanate-containing adhesive composition using the Airflex 7522 DEV polyvinyl alcohol stabilized vinyl chloride-ethylene copolymer latex (Run 16) exhibited a surprisingly long pot life compared to the other polymer latexes.

EXAMPLE 7

This examples illustrates the equivalent bonding strengths of birch and Douglas fir veneer laminates prepared from a water-dispersible polyisocyanate (Rubinate MF-178) and a conventional nonwater dispersible polyisocyanate (PAPI-27) as curing agents. Runs 21 and 22 used an vinyl chloride-ethylene copolymer latex stabilized with 6% polyvinyl alcohol. Runs 23 and 24 used the vinyl chloride-ethylene terpolymer in which the latex terpolymer contained 4% hydroxyethyl acrylate and was stabilized with 6% polyvinyl alcohol. The veneers were prepared by cold pressing at one hour, 55 psi.

TABLE 7

| | Birch Veneers | | | | Douglas Fir Veneers | | | |
|---|---|---|---|---|---|---|---|---|
| | Initial | | After Boil | | Initial | | After Boil | |
| Run | Shear Strength (PSI) | Fiber Transfer Rating[1] | Shear Strength (PSI) | Fiber Transfer Rating | Shear Strength (PSI) | Fiber Transfer Rating | Shear Strength (PSI) | Fiber Transfer Rating |
| 21 (20% MF-178) | 800 | 28 | 480 | 26 | 380 | 38 | 205 | 22 |
| 22 (20% PAPI-27) | 645 | 27 | 455 | 24 | 320 | 30 | 160 | 14 |
| 23 (20% MF-178) | 795 | 36 | 440 | 20 | 315 | 30 | 200 | 20 |
| 24 (20% PAPI-27) | 805 | 34 | 450 | 20 | 330 | 32 | 205 | 20 |

[1]0–40 scale with >24 being good
Boil test conditions:
2 CYCLES: boil 4 hr., dry 20 hr @ 120° F.
1 CYCLE: boil, cool to RT (in water) and test wet

EXAMPLE 8

In this example it can be seen that the nonwater-dispersible polyisocyanate provided bonding strength almost comparable to that achieved using the water-dispersible polyisocyanate by either a cold or hot laminating procedure. The latex used in both Runs 25 and 26 was the PVOH (6%) stabilized vinyl chloride-ethylene terpolymer containing 4% hydroxyethyl acrylate.

TABLE 8

| | | Shear Strength (PSI) | | | |
|---|---|---|---|---|---|
| | | Cold Press[1] | | Hot Press[2] | |
| Run | Polyisocyanate | Initial | After Boil | Initial | After Boil |
| 25 | Rubinate MF178 (20%) | 680 | 485 | 530 | 450 |
| 26 | PAPI-27 (20%) | 635 | 425 | 470 | 400 |

[1]Conditions: 1 Hr @ 55 PSI
[2]Conditions: 5 mins @ 300° F., 55 PSI
[3]Conditions:
2 cycles: boil 4 hrs, dry 20 hrs @ 120° F.
1 cycle: boil 4 hrs, cool to R.T. (in water), test wet

EXAMPLE 9

This example demonstrates that PAPI-27 nondispersible polyisocyanate and Rubinate MF178 water-dispersible polyisocyanate when blended with Airflex 7522 DEV latex provided an adhesive composition having very similar pot lives. The procedure for determining the pot life was that method used in Example 5. Each polyisocyanate material was blended with Airflex 7522 DEV copolymer latex at the 10 wt % level.

TABLE 9

| Time (min) | MF-178 | PAPI-27 |
|---|---|---|
| 15 | — | 3 |
| 20 | 8 | — |
| 30 | — | 5 |
| 40 | 12 | — |
| 60 | 12 | 13 |

EXAMPLE 10

In Runs 27-29 a polyvinyl alcohol (6%) stabilized vinyl chloride-ethylene copolymer (Tg 10° C.) latex was blended with 20 wt %, based on copolymer, of various nonwater dispersible polyisocyanate compositions. Each blend was evaluated in a cold pressed 3-ply birch veneer laminate according to ASTM D906. Table 10 demonstrates that the various polyisocyanates provided comparable compositions when blended with the copolymer latex.

TABLE 10

| Run | Polyisocyanate | Initial Shear Resistance (PSI) | Initial Fiber Transfer (%) | After Boil Cycles Shear Resistance (PSI) | After Boil Cycles Fiber Transfer (%) |
|---|---|---|---|---|---|
| 27 | PAPI-27 | 620 | 100 | 360 | 100 |
| 28 | Mondur MR | 595 | 100 | 355 | 100 |
| 29 | PAPI-135 | 615 | 100 | 385 | 100 |

STATEMENT OF INDUSTRIAL APPLICATION

The present invention provides an aqueous polyvinyl alcohol/vinyl chloride-ethylene copolymer/polyisocyanate adhesive composition especially suited for laminating wood substrates.

We claim:

1. In a method for making a wood-wood laminate by applying an aqueous polymer/isocyanate adhesive composition to a surface of the first wood substrate and joining the adhesive-coated surface with a surface of the second wood substrate, the improvement which comprises applying a water-based adhesive composition consisting essentially of:
   (a) a vinyl chloride-ethylene copolymer latex prepared by emulsion polymerization in the presence of a stabilizing system consisting essentially of 3-15 wt % polyvinyl alcohol, based on monomers, and
   (b) 5-50 wt %, based on copolymer, of a polyisocyanate.

2. The method of claim 1 in which the adhesive composition contains 10-30 wt % polyisocyanate.

3. The method of claim 1 in which the polyisocyanate is non-water dispersible polyisocyanate.

4. The method of claim 1 in which the copolymer is prepared in the presence of 4-10 wt % polyvinyl alcohol which is 87-89 mole % hydrolyzed.

5. In a method for making a wood-wood laminate by applying an aqueous polymer/isocyanate adhesive composition to a surface of the first wood substrate and joining the adhesive-coated surface with a surface of the second wood substrate, the improvement which comprises applying an adhesive composition consisting essentially of aqueous copolymer latex and a polyisocyanate having an isocyanate functionality greater than two, the aqueous latex containing 20-70% solids of a copolymer prepared by the emulsion polymerization of a monomer mixture that provides a copolymer consisting essentially of 65-90 wt % vinyl chloride, 5-35 wt % ethylene, and 0-10 wt % $C_2$-$C_4$ hydroxyalkyl (meth)acrylate in the presence of a stabilizing system consisting essentially of 3-15 wt % (based on monomers) polyvinyl alcohol which is 70-91 mole % hydrolyzed.

6. The method of claim 5 in which the copolymer is 2-8 wt % hydroxyethylacrylate.

7. The method of claim 5 in which the copolymer is prepared in the presence of 4-10 wt % polyvinyl alcohol which is 87-89 mole % hydrolyzed.

8. The method of claim 6 in which the copolymer is prepared in the presence of 4-10 wt % polyvinyl alcohol which is 87-89 mole % hydrolyzed.

9. In a method for joining a wood substrate to a second wood substrate which comprises applying a coating of an aqueous polymer/polyisocyanate adhesive composition to a surface of the first wood substrate, partially drying the adhesive coating and joining the adhesive-coated surface with a surface of the second wood substrate, the improvement which comprises applying an adhesive composition consisting essentially of an aqueous copolymer latex and 10-30 wt % (based on copolymer) polyisocyanate having an isocyanate functionally greater than two, the aqueous latex containing 40-60% solids of a copolymer prepared by the emulsion polymerization of a monomer mixture that provides a copolymer consisting essentially of 65-90 wt % vinyl chloride, 5-35 wt % ethylene, and 0-10 wt % $C_2$-$C_4$ hydroxylalkyl (meth)acrylate in the presence of a stabilizing system consisting essentially of 4-10 wt % (based on monomers) polyvinyl alcohol which is 87-89 mole % hydrolyzed.

10. The method of claim 9 in which the copolymer is 65-90 wt % vinyl chloride and 20-25 wt % ethylene.

11. The method of claim 9 in which the copolymer contains 2-8 wt % hydroxyethyl acrylate.

* * * * *